US007788024B2

(12) United States Patent
Livshiz et al.

(10) Patent No.: US 7,788,024 B2

(45) Date of Patent: Aug. 31, 2010

(54) METHOD OF TORQUE INTEGRAL CONTROL LEARNING AND INITIALIZATION

(75) Inventors: Michael Livshiz, Ann Arbor, MI (US); Christopher E. Whitney, Highland, MI (US); Jeffrey M. Kaiser, Highland, MI (US); Todd R. Shupe, Milford, MI (US); Scott J. Chynoweth, Davison, MI (US); Lan Wang, Troy, MI (US)

(73) Assignee: GM Global Technology Operations, Inc.

( * ) Notice: Subject to any disclaimer, the term of this patent is extended or adjusted under 35 U.S.C. 154(b) by 365 days.

(21) Appl. No.: 12/014,944

(22) Filed: Jan. 16, 2008

(65) Prior Publication Data

US 2009/0118966 A1 May 7, 2009

Related U.S. Application Data

(60) Provisional application No. 60/984,882, filed on Nov. 2, 2007.

(51) Int. Cl.
*G06F 19/00* (2006.01)

(52) U.S. Cl. ...................................... 701/114; 701/115

(58) Field of Classification Search ................. 701/101, 701/111, 112, 114, 115; 123/351, 352, 361, 123/395, 396, 399, 435
See application file for complete search history.

(56) References Cited

U.S. PATENT DOCUMENTS

| | | | | |
|---|---|---|---|---|
| 6,026,779 | A * | 2/2000 | Obata et al. | 123/295 |
| 6,050,238 | A * | 4/2000 | Suzuki et al. | 123/295 |
| 6,178,945 | B1 * | 1/2001 | Suzuki et al. | 123/295 |
| 6,704,638 | B2 | 3/2004 | Livshiz et al. | |
| 6,993,427 | B2 * | 1/2006 | Ueda | 701/111 |
| 7,124,012 | B2 * | 10/2006 | Feder et al. | 701/101 |
| 7,199,540 | B2 * | 4/2007 | Yaguchi | 318/432 |
| 2009/0018733 | A1 * | 1/2009 | Livshiz et al. | 701/54 |

OTHER PUBLICATIONS

U.S. Appl. No. 11/656,929, filed Jan. 23, 2007, Livshiz et al.
U.S. Appl. No. 60/861,492, filed Nov. 29, 2006, Livshiz et al.

* cited by examiner

*Primary Examiner*—John T Kwon

(57) ABSTRACT

A torque control system comprises a torque correction factor module, a RPM-torque transition module, and a selection module. The torque correction factor module determines a first torque correction factor and a second torque correction factor. The RPM-torque transition module stores the first torque correction factor. The selection module selectively outputs one of the first torque correction factor and the second torque correction factor based on a control mode of the torque control system.

21 Claims, 4 Drawing Sheets

METHOD OF TORQUE INTEGRAL CONTROL LEARNING AND INITIALIZATION

CROSS-REFERENCE TO RELATED APPLICATIONS

This application claims the benefit of U.S. Provisional Application No. 60/984,882, filed on Nov. 2, 2007. The disclosure of the above application is incorporated herein by reference.

FIELD

The present disclosure relates to control of internal combustion engines and, more particularly, to learning and initializing a torque integral of torque-based control of internal combustion engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired predicted torque. Traditional engine control systems, however, do not control the engine torque output as accurately as desired. Further, traditional engine control systems do not provide as rapid of a response to control signals as is desired or coordinate engine torque control among various devices that affect engine torque output.

SUMMARY

A torque control system comprises a torque correction factor module, a RPM-torque transition module, and a selection module. The torque correction factor module determines a first torque correction factor and a second torque correction factor. The RPM-torque transition module stores the first torque correction factor. The selection module selectively outputs one of the first torque correction factor and the second torque correction factor based on a control mode of the torque control system.

A method of operating a torque control system comprises determining a first torque correction factor and a second torque correction factor, storing the first torque correction factor, and selectively outputting one of the first torque correction factor and the second torque correction factor based on a control mode of the torque control system.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
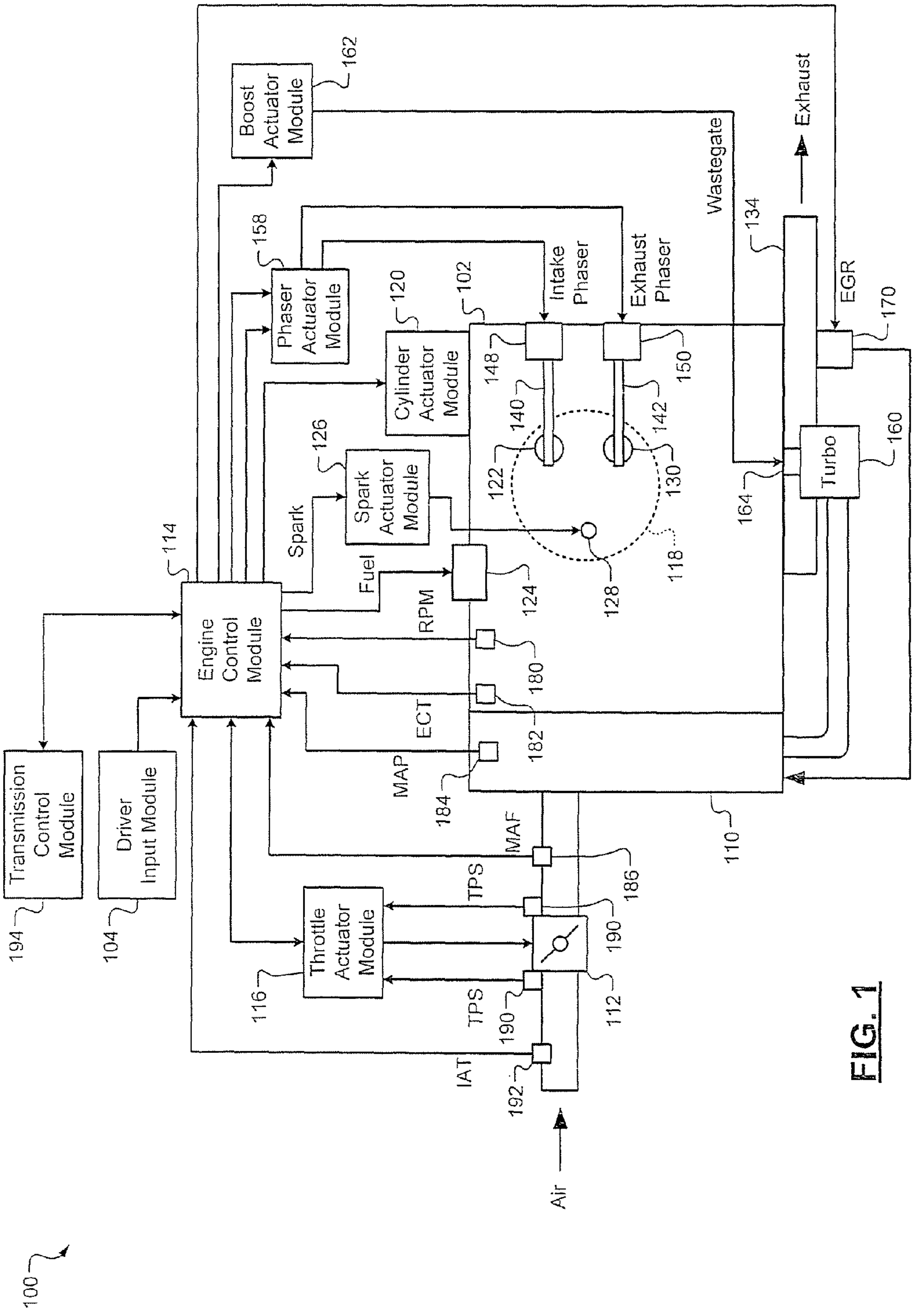
FIG. 1 is a functional block diagram of an exemplary engine system according to the principles of the present disclosure.

The following description is merely exemplary in nature and is not intended to limit the present disclosure, application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of an exemplary implementation of an engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control the exhaust valves of multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate some of the compressed air charge's heat, which is determined when air is compressed and may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce torque during a gear shift.

To abstractly refer to the various control mechanisms of the engine 102, each system that varies an engine parameter may be referred to as an actuator. For example, the throttle actuator module 116 can change the blade position, and therefore the opening area, of the throttle valve 112. The throttle actuator module 116 can therefore be referred to as an actuator, and the throttle opening area can be referred to as an actuator position.

Similarly, the spark actuator module 126 can be referred to as an actuator, while the corresponding actuator position is an amount of a spark advance. Other actuators include the boost actuator module 162, the EGR valve 170, the phaser actuator module 158, the fuel injection system 124, and the cylinder actuator module 120. The term actuator position with respect to these actuators may correspond to boost pressure, EGR valve opening, intake and exhaust cam phaser angles, air/fuel ratio, and number of cylinders activated, respectively.

When an engine transitions from producing one torque to producing another torque, many actuator positions will change to produce the new torque most efficiently. For example, the spark advance, throttle position, exhaust gas recirculation (EGR) regulation, and cam phaser positions may change. Changing one of these actuator positions often creates engine conditions that would benefit from changes to other actuator positions, which might then result in changes to the original actuators. This feedback results in iteratively updating actuator positions until they are all positioned to produce a desired predicted torque most efficiently.

Large changes in torque often cause significant changes in engine actuators, which cyclically cause significant change in other engine actuators. This is especially true when using a boost device, such as a turbocharger or supercharger. For example, when the engine is commanded to significantly increase a torque output, the engine may request that the turbocharger increase boost.

In various implementations, when boost pressure is increased, detonation, or engine knock, is more likely. Therefore, as the turbocharger approaches this increased boost level, the spark advance may need to be decreased. Once the spark advance is decreased, the desired turbocharger boost may need to be increased to achieve the desired predicted torque.

Figure 2:
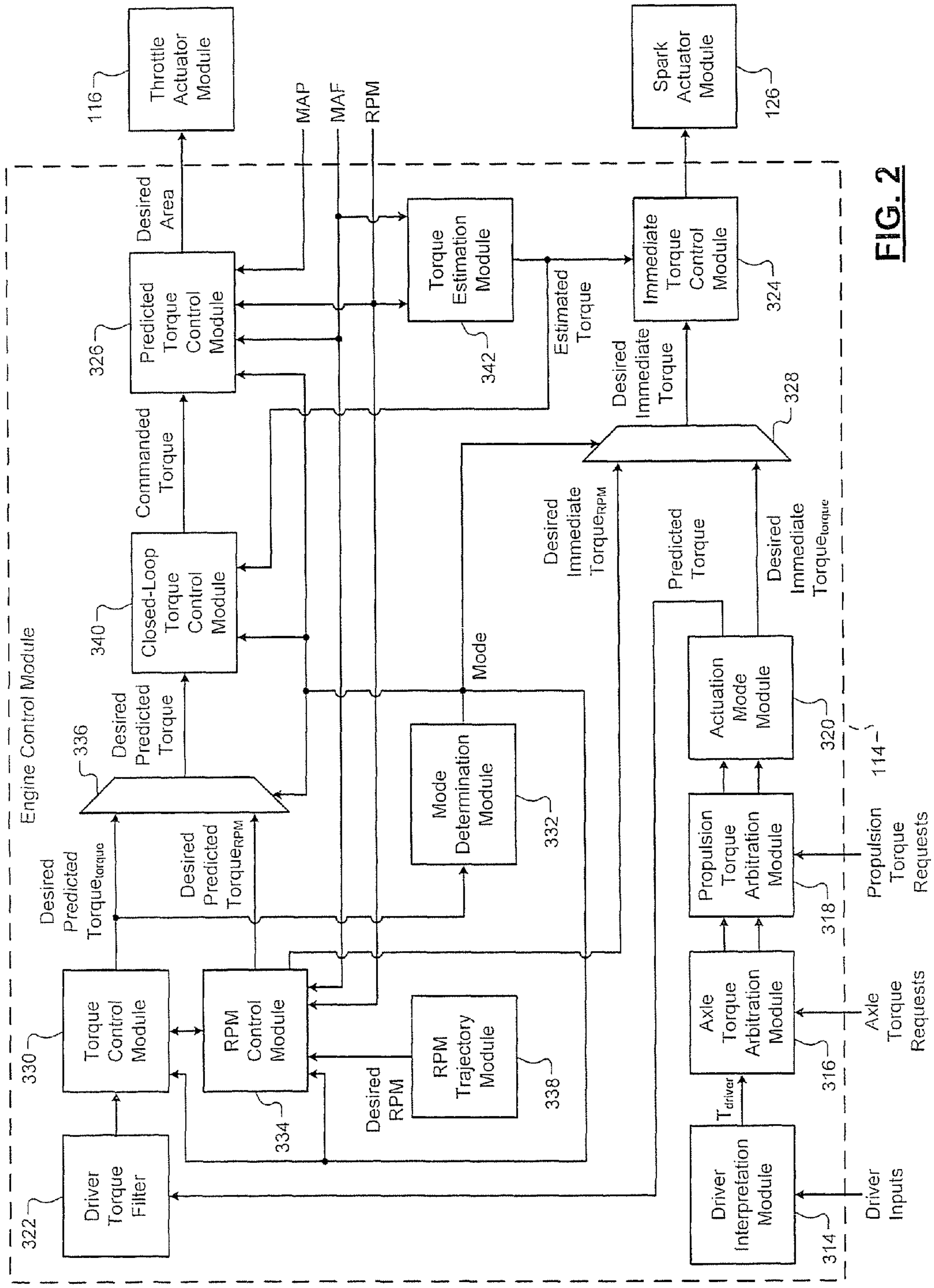
FIG. 2 is a functional block diagram of an exemplary implementation of an engine control module according to the principles of the present disclosure.

This circular dependency causes the engine to reach the desired predicted torque more slowly. This problem is exacerbated because of the already slow response of turbocharger boost, commonly referred to as turbo lag. FIG. 2 depicts an engine control system capable of accelerating the circular dependency of boost and spark advance.

Figure 3:
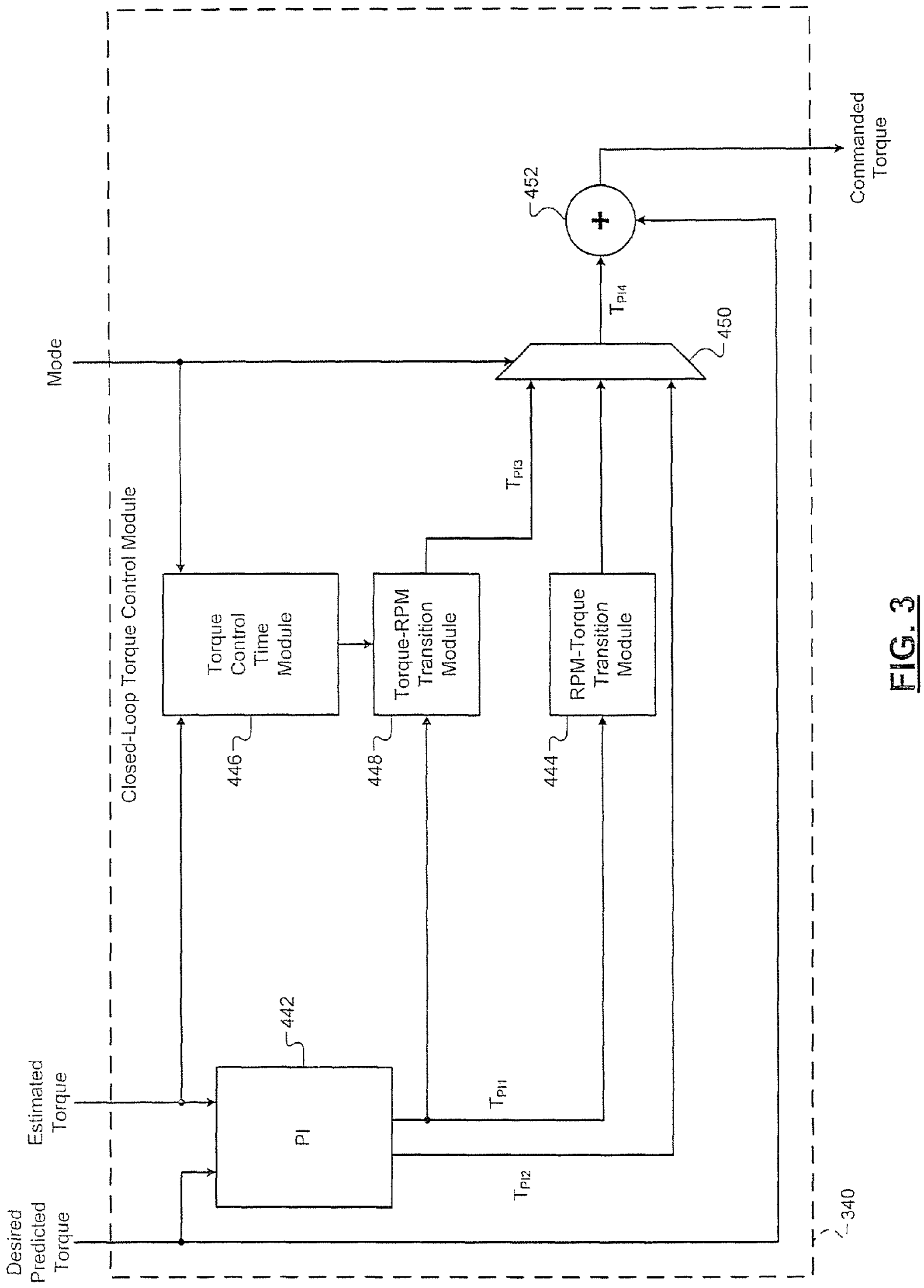
FIG. 3 is a functional block diagram of an exemplary implementation of a closed-loop torque control module according to the principles of the present disclosure.

FIG. 3 depicts a closed-loop torque control module that determines a torque correction factor at the new torque level and determines a commanded torque based on the torque correction factor. The closed-loop torque control module outputs the commanded torque to a predicted torque control module. The predicted torque control module estimates the airflow that will be present at the commanded torque and determines desired actuator positions based on the estimated airflow. The predicted torque control module then determines engine parameters based on the desired actuator positions and the desired predicted torque. For example, the engine parameters may include desired manifold absolute pressure (MAP), desired throttle area, and/or desired air per cylinder (APC).

Figure 4:
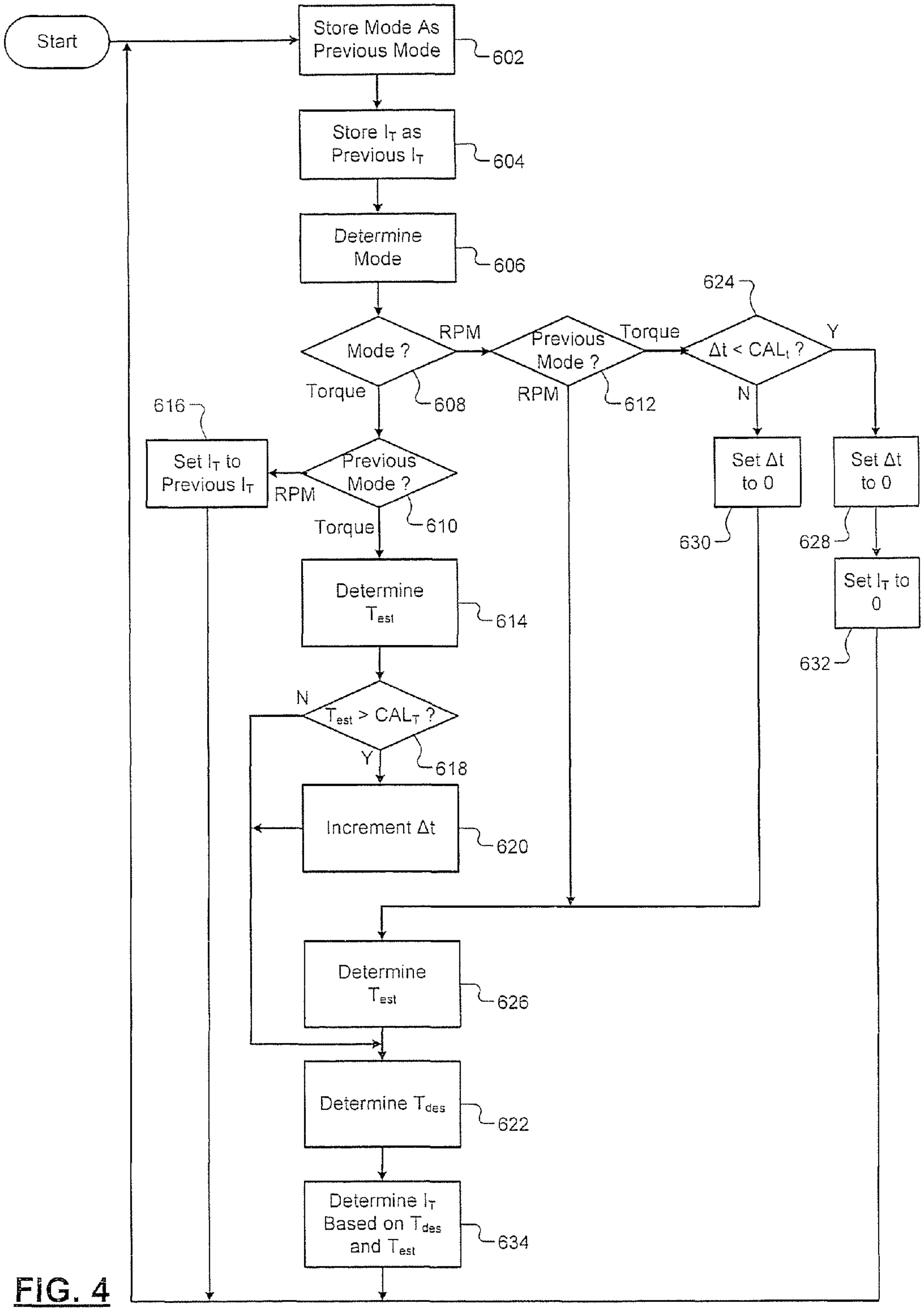
FIG. 4 is a flowchart depicting exemplary steps performed by the closed-loop torque control module according to the principles of the present disclosure.

In other words, the predicted torque control module can essentially perform the first iteration of actuator position updating in software. The actuator positions commanded should then be closer to the final actuator positions. FIG. 4 depicts exemplary steps performed by the closed-loop torque control module to determine when and how to perform this modeled iteration.

Referring now to FIG. 2, a functional block diagram of an exemplary implementation of the ECM 114 is presented. The ECM 114 includes a driver interpretation module 314. The driver interpretation module 314 receives driver inputs from the driver input module 104. For example, the driver inputs may include an accelerator pedal position. The driver interpretation module outputs a driver torque, which is the amount of torque requested by a driver via the driver inputs.

The ECM 114 includes an axle torque arbitration module 316. The axle torque arbitration module 316 arbitrates between driver inputs from the driver interpretation module 314 and other axle torque requests. Other axle torque requests may include torque reduction requested during a gear shift by the transmission control module 194, torque reduction requested during wheel slip by a traction control system, and torque requests to control speed from a cruise control system.

The axle torque arbitration module 316 outputs a predicted torque and a torque desired immediate torque. The predicted torque is the amount of torque that will be required in the future to meet the driver's torque and/or speed requests. The torque desired immediate torque is the torque required at the present moment to meet temporary torque requests, such as torque reductions when shifting gears or when traction control senses wheel slippage.

The torque desired immediate torque may be achieved by engine actuators that respond quickly, while slower engine actuators are targeted to achieve the predicted torque. For example, a spark actuator may be able to quickly change the spark advance, while cam phaser or throttle actuators may be slower to respond. The axle torque arbitration module 316 outputs the predicted torque and the torque desired immediate torque to a propulsion torque arbitration module 318.

The propulsion torque arbitration module 318 arbitrates between the predicted torque, the torque desired immediate torque and propulsion torque requests. Propulsion torque requests may include torque reductions for engine over-speed protection and torque increases for stall prevention.

An actuation mode module 320 receives the predicted torque and the torque desired immediate torque from the propulsion torque arbitration module 318. Based upon a mode setting, the actuation mode module 320 determines how the predicted torque and the torque desired immediate torque will be achieved. For example, in a first mode of operation, the actuation mode module 320 may output the predicted torque to a driver torque filter 322.

In the first mode of operation, the actuation mode module 320 may instruct an immediate torque control module 324 to set the spark advance to a calibration value that achieves the maximum possible torque. The immediate torque control module 324 may control engine parameters that change relatively more quickly than engine parameters controlled by a predicted torque control module 326. For example, the immediate torque control module 324 may control spark advance, which may reach a commanded value by the time the next cylinder fires. In the first mode of operation, the torque desired immediate torque is ignored by the predicted torque control module 326 and by the immediate torque control module 324.

In a second mode of operation, the actuation mode module 320 may output the predicted torque to the driver torque filter 322. However, the actuation mode module 320 may instruct the Immediate torque control module 324 to attempt to achieve the torque desired immediate torque, such as by retarding the spark.

In a third mode of operation, the actuation mode module 320 may instruct the cylinder actuator module 120 to deactivate cylinders if necessary to achieve the torque desired immediate torque. In this mode of operation, the predicted torque is output to the driver torque filter 322 and the torque desired immediate torque is output to a first selection module 328. For example only, the first selection module 328 may be a multiplexer or a switch.

In a fourth mode of operation, the actuation mode module 320 outputs a reduced torque to the driver torque filter 322. The predicted torque may be reduced only so far as is necessary to allow the immediate torque control module 324 to achieve the torque desired immediate torque using spark retard.

The driver torque filter 322 receives the predicted torque from the actuation mode module 320. The driver torque filter 322 may receive signals from the axle torque arbitration module 316 and/or the propulsion torque arbitration module 318 indicating whether the predicted torque is a result of driver input. If so, the driver torque filter 322 may filter out high frequency torque changes, such as those that may be caused by the driver's foot modulating the accelerator pedal while on rough road. The driver torque filter 322 outputs the predicted torque to a torque control module 330.

The ECM 114 includes a mode determination module 332. For example only, the mode determination module 332 may receive a torque desired predicted torque from the torque control module 330. The mode determination module 332 may determine a control mode based on the torque desired predicted torque. When the torque desired predicted torque is less than a calibrated torque, the control mode may be an RPM control mode. When the torque desired predicted torque is greater than or equal to the calibrated torque, the control mode may be a torque control mode. The control mode $MODE_1$ may be determined by the following equation:

$$MODE_1 = \begin{bmatrix} RPM, & \text{if}(T_{torque} < CAL_T) \\ \text{TORQUE}, & \text{if}(T_{torque} \geq CAL_T) \end{bmatrix}, \quad (1)$$

where $T_{torque}$ is the torque desired predicted torque and $CAL_T$ is the calibrated torque.

The torque control module 330 receives the predicted torque from the driver torque filter 322, the control mode from the mode determination module 332, and an RPM desired predicted torque from an RPM control module 334. The torque control module 330 determines (i.e., initializes) a delta torque based on the predicted torque and the RPM desired predicted torque when the control mode is transitioning from the RPM control mode to the torque control mode. The delta torque $T_{delta}$ may be determined by the following equation:

$$T_{delta}=T_{RPMLC}-T_{zero}, \quad (2)$$

where $T_{RPMLC}$ is a last commanded RPM desired predicted torque, and $T_{zero}$ is a torque value at a zero accelerator pedal position (i.e., when the driver's foot is off the accelerator pedal) that is determined based on the predicted torque. The torque control module 330 may decay each term of the equation defining the delta torque to zero when the control mode is the torque control mode. For example only, the delta torque may be decayed linearly, exponentially, and/or in pieces.

The torque control module 330 adds the delta torque to the predicted torque to determine the torque desired predicted torque. The torque desired predicted torque $T_{torque}$ may be determined by the following equation:

$$T_{torque}=T_{pp}+T_{zero}+T_{delta}, \quad (3)$$

where $T_{pp}$ is a torque value at the accelerator pedal position that is determined based on the predicted torque.

Further discussion of the functionality of the torque control module 330 may be found in commonly assigned U.S. Pat. No. 7,021,282, issued on Apr. 4, 2006 and entitled "Coordinated Engine Torque Control," the disclosure of which is incorporated herein by reference in its entirety. The torque control module 330 outputs the torque desired predicted torque to a second selection module 336. For example only, the second selection module 336 may be a multiplexer or a switch.

The ECM 114 includes an RPM trajectory module 338. The RPM trajectory module 338 determines a desired RPM based on a standard block of RPM control described in detail in commonly assigned U.S. Pat. No. 6,405,587, issued on Jun. 18, 2002 and entitled "System and Method of Controlling the Coastdown of a Vehicle," the disclosure of which is expressly incorporated herein by reference in its entirety. For example only, the desired RPM may include a desired idle RPM, a stabilized RPM, a target RPM, or a current RPM.

The RPM control module 334 receives the desired RPM from the RPM trajectory module 338, the control mode from the mode determination module 332, an RPM signal from the RPM sensor 180, a MAF signal from the MAF sensor 186, and the torque desired predicted torque from the torque control module 330. The RPM control module 334 determines a minimum torque required to maintain the desired RPM, for example, from a look-up table. The RPM control module 334 determines a reserve torque. The reserve torque is an additional amount of torque that is incorporated to compensate for unknown loads that can suddenly load the engine system 100.

The RPM control module 334 determines a run torque based on the MAF signal. The run torque $T_{run}$ is determined based on the following relationship:

$$T_{run}=f(APC_{act}, RPM,S,I,E), \quad (4)$$

where $APC_{act}$ is an actual air per cylinder value that is determined based on the MAF signal, S is the spark advance, I is intake cam phaser positions, and E is exhaust cam phaser positions.

The RPM control module 334 compares the desired RPM to the RPM signal to determine an RPM correction factor. The RPM control module 334 adds the RPM correction factor to the minimum and reserve torques to determine the RPM desired predicted torque. The RPM control module 334 subtracts the reserve torque from the run torque and adds this value to the RPM correction factor to determine an RPM desired immediate torque.

In various implementations, the RPM control module 334 may simply determine the RPM correction factor equal to the difference between the desired RPM and the RPM signal. Alternatively, the RPM control module 334 may use a proportional-integral (PI) control scheme to meet the desired RPM from the RPM trajectory module 338. The RPM correction factor may include an RPM proportional, or a proportional offset based on the difference between the desired RPM and the RPM signal. The RPM correction factor may also include an RPM integral, or an offset based on an integral of the difference between the desired RPM and the RPM signal. The RPM proportional $P_{rpm}$ may be determined by the following equation:

$$P_{RPM}=K_p*(RPM_{des}-RPM), \quad (5)$$

where $K_p$ is a pre-determined proportional constant. The RPM integral IRPM may be determined by the following equation:

$$I_{RPM}=K_I*\int(RPM_{des}-RPM)\partial t, \quad (6)$$

where $K_I$ is a pre-determined integral constant.

Further discussion of PI control can be found in commonly assigned patent application Ser. No. 11/656929, filed Jan. 23, 2007, and entitled "Engine Torque Control at High Pressure Ratio," the disclosure of which is incorporated herein by reference in its entirety. Additional discussion regarding PI control of engine speed can be found in commonly assigned patent application 60/861492, filed Nov. 28, 2006, and entitled "Torque Based Engine Speed Control," the disclosure of which is incorporated herein by reference in its entirety.

The RPM control module 334 determines (i.e., initializes) the RPM integral based on the minimum torque and the torque desired predicted torque when the control mode is transitioning from the torque control mode to the RPM control mode. The RPM integral $I_{RPM}$ may be determined by the following equation:

$$I_{RPM}=T_{torqueLC}-T_{min}, \quad (7)$$

where $T_{torqueLC}$ is a last commanded torque desired predicted torque and $T_{min}$ is the minimum torque.

The RPM desired predicted torque $T_{RPM}$ may be determined by the following equation:

$$T_{RPM}=T_{min}+T_{res}+P_{RPM}+I_{RPM}, \quad (8)$$

where $T_{res}$ is the reserve torque. Further discussion of the functionality of the RPM control module 334 may be found in commonly assigned patent application 60/861492, filed Nov. 28, 2006, and entitled "Torque Based Speed Control," the disclosure of which is incorporated herein by reference in its entirety. The RPM control module 334 outputs the RPM desired predicted torque to the second selection module 336 and the RPM desired immediate torque to the first selection module 328.

The second selection module 336 receives the torque desired predicted torque from the torque control module 330 and the RPM desired predicted torque from the RPM control module 334. The mode determination module 332 controls the second selection module 336 to choose whether the torque desired predicted torque or the RPM desired predicted torque should be used to determine a desired predicted torque. The mode determination module 332 therefore instructs the second selection module 336 to output the desired predicted torque from either the torque control module 330 or the RPM control module 334.

The mode determination module 332 may select the desired predicted torque based upon the control mode. The mode determination module 332 may select the desired predicted torque to be based upon the torque desired predicted torque when the control mode is the torque control mode. The mode determination module 332 may select the desired predicted torque to be based upon the RPM desired predicted torque when the control mode is the RPM control mode. The second selection module 336 outputs the desired predicted torque to a closed-loop torque control module 340.

The closed-loop torque control module 340 receives the desired predicted torque from the second selection module 336, the control mode from the mode determination module 332, and an estimated torque from a torque estimation module 342. The estimated torque may be defined as the amount of torque that could immediately be produced by setting the spark advance to a calibrated value. This value may be calibrated to be the minimum spark advance that achieves the greatest torque for a given RPM and air per cylinder. The torque estimation module 342 may use the MAF signal from the MAF sensor 186 and the RPM signal from the RPM sensor 180 to determine the estimated torque. Further discussion of torque estimation can be found in commonly assigned U.S. Pat. No. 6,704,638, issued on Mar. 9, 2004 and entitled "Torque Estimator for Engine RPM and Torque Control," the disclosure of which is incorporated herein by reference in its entirety.

The closed-loop torque control module 340 compares the desired predicted torque to the estimated torque to determine a torque correction factor. The closed-loop torque control module 340 adds the torque correction factor to the desired predicted torque to determine a commanded torque.

In various implementations, the closed-loop torque control module 340 may simply determine the torque correction factor equal to the difference between the desired predicted torque and the estimated torque. Alternatively, the closed-loop torque control module 340 may use a PI control scheme to meet the desired predicted torque from the second selection module 336. The torque correction factor may include a torque proportional, or a proportional offset based on the difference between the desired predicted torque and the estimated torque. The torque correction factor may also include a torque integral, or an offset based on an integral of the difference between the desired predicted torque and the estimated torque. The torque correction factor $T_{PI}$ may be determined by the following equation:

$$T_{PI}=K_p*(T_{des}-T_{est})+K_I*\int(T_{des}-T_{est})\partial t, \tag{9}$$

where $K_p$ is a pre-determined proportional constant and $K_I$ is a pre-determined integral constant.

The closed-loop torque control module 340 outputs the commanded torque to the predicted torque control module 326. The predicted torque control module 326 receives the commanded torque, the control mode from the mode determination module 332, the MAF signal from the MAF sensor 186, the RPM signal from the RPM sensor 180, and the MAP signal from the MAP sensor 184. The predicted torque control module 326 converts the commanded torque to desired engine parameters, such as desired manifold absolute pressure (MAP), desired throttle area, and/or desired air per cylinder (APC). For example only, the predicted torque control module 326 may determine the desired throttle area, which is output to the throttle actuator module 116. The throttle actuator module 116 then regulates the throttle valve 112 to produce the desired throttle area.

The first selection module 328 receives the torque desired immediate torque from the actuation mode module 320 and the RPM desired immediate torque from the RPM control module 334. The mode determination module 332 controls the first selection module 328 to choose whether the torque desired immediate torque or the RPM desired immediate torque should be used to determine a desired immediate torque. The mode determination module 332 therefore instructs the first selection module 328 to output the desired immediate torque from either the propulsion torque arbitration module 318 or the RPM control module 334.

The mode determination module 332 may select the desired immediate torque based upon the control mode. The mode determination module 332 may select the desired immediate torque to be based upon the torque desired immediate torque when the control mode is the torque control mode. The mode determination module 332 may select the desired immediate torque to be based upon the RPM desired immediate torque when the control mode is the RPM control mode. The first selection module 328 outputs the desired immediate torque to the immediate torque control module 324.

The immediate torque control module 324 receives the desired immediate torque from the first selection module 328 and the estimated torque from the torque estimation module 342. The immediate torque control module 324 may set the spark advance using the spark actuator module 126 to achieve the desired immediate torque. The immediate torque control module 324 can then select a smaller spark advance that reduces the estimated torque to the desired immediate torque.

Referring now to FIG. 3, a functional block diagram of an exemplary implementation of the closed-loop torque control module 340 is presented. The closed-loop torque control module 340 includes a PI module 442. The PI module 442 receives the desired predicted torque from the second selection module 336 and the estimated torque from the torque estimation module 342.

The PI module 442 compares the desired predicted torque to the estimated torque to determine a first torque correction factor and a second torque correction factor. The PI module 442 may use the PI control scheme, or other control schemes, to meet the desired predicted torque. The first and second torque correction factors may each include at least one of a torque proportional and a torque integral.

A RPM-torque transition module 444 receives the first torque correction factor from the Pi module 442. For example only, the RPM-torque transition module 444 may determine a previous torque correction factor based on the first torque correction factor and a previous torque integral. The previous torque integral may be a previously-stored (i.e., learned) torque integral of a previous first torque correction factor. To determine the previous torque correction factor, the RPM-torque transition module 444 may set the torque integral of the first torque correction factor to the previous torque integral. The RPM-torque transition module 444 may then store (i.e., learn) the torque integral of the first torque correction factor as the previous torque integral.

The closed-loop torque control module 340 includes a torque control time module 446. The torque control time module 446 receives the estimated torque from the torque estimation module 342 and the control mode from the mode determination module 332. The torque control time module 446 increments a torque control time when the control mode is the torque control mode and when the estimated torque is greater than a calibrated torque. The torque control time $\Delta t$ may be determined by the following equation:

$$\Delta t_k=\Delta t_{k-1}+1, if T_{est}>CAL_T, \tag{10}$$

where $T_{est}$ is the estimated torque, and $CAL_T$ is the calibrated torque.

A torque-RPM transition module 448 receives the first torque correction factor from the PI module 442 and the torque control time from the torque control time module 446. The torque-RPM transition module 448 determines a third torque correction factor based on the first torque correction factor when the torque control time is greater than a calibrated time. The torque-RPM transition module 448 sets the torque integral of the first torque correction factor to zero and determines the third torque correction factor based on the new first torque correction factor when the torque control time is less than the calibrated time. The torque integral of the third torque correction factor $I_{T0}$ may be determined by the following equation:

$$I_{T0} = \begin{bmatrix} 0, & \text{if}(\Delta t < CAL_t) \\ I_T * f(\Delta T_{des}, RPM), & \text{if}(\Delta t > CAL_t) \end{bmatrix}, \quad (11)$$

where $CAL_t$ is the calibrated time and $\Delta T_{des}$ is a change in the desired predicted torque.

A selection module 450 receives the second torque correction factor from the PI module 442, the previous torque correction factor from the RPM-torque transition module 444, and the third torque correction factor from the torque-RPM transition module 448. The mode determination module 332 controls the selection module 450 to choose whether the second torque correction factor, the previous torque correction factor, or the third torque correction factor should be used to determine a fourth torque correction factor. The mode determination module 332 therefore instructs the selection module 450 to determine the fourth torque correction factor from the PI module 442, the RPM-torque transition module 444, or the torque-RPM transition module 448.

The selection module 450 determines the fourth torque correction factor from the PI module 442 when the control mode is the torque control mode. The selection module 450 determines the fourth torque correction factor from the PI module 442 when the control mode is the RPM control mode. In other words, the torque integral of the fourth torque correction factor is learned from the PI module 442 when the control mode is the torque control mode or the RPM control mode.

The selection module 450 determines the fourth torque correction factor from the RPM-torque transition module 444 when the control mode is transitioning from the RPM control mode to the torque control mode. In other words, the torque integral of the fourth torque correction factor is initialized to the previous torque integral when the control mode is transitioning from the RPM control mode to the torque control mode. The selection module 450 determines the fourth torque correction factor from the torque-RPM transition module 448 when the control mode is transitioning from the torque control mode to the RPM control mode. In other words, the torque integral of the fourth torque correction factor is initialized to zero or to the torque integral of the second torque correction factor when the control mode is transitioning from the torque control mode to the RPM control mode.

A summation module 452 receives the fourth torque correction factor from the selection module 450 and the desired predicted torque from the second selection module 336. The summation module 452 adds the fourth torque correction factor and the desired predicted torque to determine the commanded torque. The summation module 452 outputs the commanded torque to the predicted torque control module 326.

Referring now to FIG. 4, a flowchart depicts exemplary steps performed by the closed-loop torque control module 340. Control begins in step 602, where the control mode is stored as a previous control mode. Control continues in step 604, where the torque integral is stored as the previous torque integral.

Control continues in step 606, where the control mode is determined. Control continues in step 608, where control determines whether the control mode is the torque control mode or the RPM control mode. If the control mode is the torque control mode, control continues in step 610; otherwise, control continues in step 612.

In step 610, control determines whether the previous control mode is the torque control mode or the RPM control mode. If the previous control mode is the torque control mode, control continues in step 614; otherwise, control continues in step 616. In step 614, the estimated torque is determined. Control continues in step 618, where control determines whether the estimated torque is greater than the calibrated torque. If the estimated torque is greater than the calibrated torque, control continues in step 620; otherwise, control continues in step 622. In step 620, the torque control time is incremented. Control continues in step 622. In step 616, the torque integral is set to the previous torque integral. Control returns to step 602.

In step 612, control determines whether the previous control mode is the torque control mode or the RPM control mode. If the previous control mode is the torque control mode, control continues in step 624; otherwise, control continues in step 626. In step 624, control determines whether the torque control time is less than the calibrated time. If the torque control time is less than the calibrated time, control continues in step 628; otherwise, control continues in step 630. In step 628, the torque control time is set to zero. Control continues in step 632, where the torque integral is set to zero. Control returns to step 602. In step 630, the torque control time is set to zero. Control continues in step 626. In step 626, the estimated torque is determined. Control continues in step 622.

In step 622, the desired predicted torque is determined. Control continues in step 634, where the torque integral is determined based on the desired predicted torque and the estimated torque. Control returns to step 602.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A torque control system comprising:

a torque correction factor module that determines a first torque correction factor and a second torque correction factor;

a RPM-torque transition module that stores the first torque correction factor and that determines a third torque correction factor based on the first torque correction factor; and a selection module that selectively outputs one of the third torque correction factor and the second torque correction factor based on a control mode of the torque control system.

2. The torque control system of claim 1 wherein the torque correction factor module determines the first and second torque correction factors based on a desired torque and an estimated torque.

3. The torque control system of claim 1 wherein the first and second torque correction factors each comprise at least one of a torque proportional component and a torque integral component.

4. The torque control system of claim 3 further comprising a torque-RPM transition module that sets the torque integral component of the first torque correction to zero when a torque control time is less than a predetermined value, wherein the torque correction factor module updates the first torque correction factor based on the setting of the torque integral component to zero, and wherein the torque-RPM module determines a fourth torque correction factor based on the updated first torque correction factor.

5. The torque control system of claim 1 further comprising a torque-RPM transition module that determines a fourth torque correction factor based on the first torque correction factor when a torque control time is greater than a predetermined value.

6. The torque control system of claim 5 further comprising a torque control time module that increments the torque control time when the torque control system is in a torque control mode and when an estimated torque is greater than a predetermined value.

7. The torque control system of claim 6 wherein the torque control time module sets the torque control time to zero when the torque control system is transitioning from the torque control mode to an engine speed (RPM) control mode.

8. The torque control system of claim 1 wherein the selection module determines a fourth torque correction factor based on the second torque correction factor when the torque control system is in one of a torque control mode and an RPM control mode.

9. The torque control system of claim 8 wherein the selection module determines the fourth torque correction factor based on a fifth torque correction factor when the torque control system is transitioning from the torque control mode to the RPM control mode.

10. The torque control system of claim 8 wherein the selection module determines the fourth torque correction factor based on the third torque correction factor when the torque control system is transitioning from the RPM control mode to the torque control mode.

11. The torque control system of claim 8 further comprising a summation module that determines a commanded torque based on the fourth torque correction factor and a desired torque and that outputs the commanded torque to an actuator module, wherein the actuator module controls an actuator of an engine based on the commanded torque.

12. A method of operating a torque control system comprising:

determining a first torque correction factor and a second torque correction factor;

storing the first torque correction factor;

determining a third torque correction factor based on the first torque correction factor; and selectively outputting one of the third torque correction factor and the second torque correction factor based on a control mode of the torque control system.

13. The method of claim 12 further comprising determining the first and second torque correction factors based on a desired torque and an estimated torque.

14. The method of claim 12 further comprising:

setting a torque integral component of the first torque correction factor to zero when a torque control time is less than a predetermined value;

updating the first torque correction factor based on the setting; and determining a fourth torque correction factor based on the updated first torque correction factor.

15. The method of claim 12 further comprising determining a fourth torque correction factor based on the first torque correction factor when a torque control time is greater than a predetermined value.

16. The method of claim 15 further comprising incrementing the torque control time when the torque control system is in a torque control mode and when an estimated torque is greater than a predetermined value.

17. The method of claim 15 further comprising setting the torque control time to zero when the torque control system is transitioning from the torque control mode to an RPM control mode.

18. The method of claim 12 further comprising determining a fourth torque correction factor based on the second torque correction factor when the torque control system is in one of a torque control mode and an RPM control mode.

19. The method of claim 18 further comprising determining the fourth torque correction factor based on a fifth torque correction factor when the torque control system is transitioning from the torque control mode to the RPM control mode.

20. The method of claim 18 further comprising determining the fourth torque correction factor based on the third torque correction factor when the torque control system is transitioning from the RPM control mode to the torque control mode.

21. The method of claim 18 further comprising:

determining a commanded torque based on the fourth torque correction factor and a desired torque; and outputting the commanded torque to an actuator module.

* * * * *